United States Patent Office 3,405,174
Patented Oct. 8, 1968

3,405,174
PREPARATION OF HYDROXYCARBOXYLIC
ACIDS AND DERIVATIVES THEREOF
Gerald Sugerman, Fort Lee, and John Kollar, Wallington,
N.J., assignors to Halcon International, Inc., a corporation of Delaware
No Drawing. Continuation-in-part of application Ser. No. 273,544, Apr. 17, 1963. This application Nov. 17, 1965, Ser. No. 508,392
5 Claims. (Cl. 260—535)

ABSTRACT OF THE DISCLOSURE

A cycloalkanol oxidate is rearranged to a hydroxy carboxylic acid and/or derivatives thereof by contacting with an organic acid having at least 2 carbon atoms and a pK below about 4.8.

This application is a continuation-in-part of our copending U.S. patent application, Ser. No. 273,544, filed Apr. 17, 1963, now abandoned.

This invention relates to a process for producing hydroxycarboxylic acids and derivatives thereof. More specifically, this invention teaches the rearrangement of cycloalkanol oxidates in the presence of strong organic acids. Hydroxycarboxylic acids and derivatives thereof are of much importance as chemical intermediates. For example, these materials are valuable precursors for the preparation of caprolactam, a valuable starting material for "nylon-6," and caprolactone. By further oxidation, adipic acid also may be produced from these derivatives.

Prior techniques for the preparation of hydroxycarboxylic acids and derivatives thereof, for example, omega-hydroxycaproic acid and omega-hydroxyvaleric acid, utilized mineral acids as the rearranging acids. The use of these materials, however, has disadvantages which have retarded the development of a successfully commercial process. For example, the mineral acids such as hydrofluoric acid, in order to be effective, must be introduced into the rearrangement in a substantially anhydrous form. Since the hydrofluoric acid must be recycled in a commercial process, and further since water is formed in the rearrangement, it is necessary to separate this water from the hydrogen fluoride. This is particularly difficult because hydrofluoric acid forms an azeotrope with water which is extremely difficult to separate.

In accordance with this invention, it has been found that "cycloalkanol oxidates" may be rearranged to hydroxycarboxylic acids and derivatives thereof by using a strong organic carboxylic acid as the rearranging agent. The derivatives of the hydroxycarboxylic acid include oligomers or polymers of the hydroxycarboxylic acid, or esters of the hydroxycarboxylic acid.

The cycloalkanols, the oxidates of which are treated herein, may be defined by the general formula:

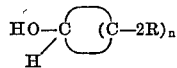

wherein $n$ is a whole integer from 4 to 11 and each R is selected from the group consisting of hydrogen; an alkyl group having from 1 to 16 carbon atoms preferably from 1 to 6; an aryl group having from 6 to 14 carbon atoms; an aralkyl group having from 7 to 16 carbon atoms; a heteroaromatic group; a carboxylic group; a fluoro group; and a chloro group. Examples of these compounds include cyclopentanol; cyclohexanol; cycloheptanol; cyclooctanol; cyclodecanol; and cyclododecanol. Substituted alkyl compounds include 2-methylcyclohexanol; 2,3-dimethylcyclooctanol; 2,3-dimethyl-4-ethylcyclododecanol; and 2-isopropylcyclopentanol. Other compounds include 2-benzylcyclohexanol; 2-(3-methylbenzyl-)cyclohexanol; 2-(pyridyl-)cyclopentanol; 3-carbomethoxycycloheptanol; 4-carbethoxycyclohexanol; and 2,3,4,5,-tetrafluorocyclohexanol.

The hydroxycarboxyl acids are generally of the omega type, i.e., having the hydroxyl radical on the carbon atoms at the end of the chain opposite the carboxyl group. However, in the case where a carbon atom of a carbon containing radical is bonded to the ortho position in respect to the peroxide group, acids in addition to the omega type are formed. More generally, it may be stated that $(n+1)$-hydroxycaproic acids are formed, wherein $(n+1)$ represents the number of carbons in the ring of the cycloalkanol precursor, as $n$ was previously defined. As an example of products formed, the oxidation and rearrangement of 2-methylcyclohexanol may be considered. The major product obtained from the rearrangement of the oxidate would be 6-hydroxheptanoic acid.

The "cycloalkanol oxidate" may be obtained in various known ways. For example, it may be obtained by the reaction of molecular oxygen with a cycloalkanol or by the reaction of cycloalkanone with hydrogen peroxide. It is preferable to oxidize from 10 to 30% of the cycloalkanol. The oxidation may be initiated by a peroxide and accomplished by passing molecular oxygen, pure or diluted with an inert gas, such as nitrogen, through the cycloalkanol with good agitation at temperatures of from about 60° to about 140° C. The pressures may be from atmospheric to 1000 p.s.i.a. or higher. The "oxidate" consists of a solution in the cycloalkanol of peroxide compounds along with minor amounts of acid, esters and ketones. Generally, the "oxidate" contains from 0.4 to 3 millimoles of peroxidic oxygen per gram of oxidate. A discussion of the products present in such an "oxidate" is found in an article by Brown et al., J.A.C.S., 77, pp. 1756–1759.

Furthermore concentration of the "oxidate" by distillation, preferably under vacuum, can be achieved so as to obtain peroxide concentrations of up to about 0.5 mole of peroxide/100 grams. Such concentrates are also suitable.

The cycloalkanol oxidate, thus constituted, is treated in accordance with the present invention with an organic acid having a dissociation constant less than 4.8 at reaction temperatures between 0 and 200° C., preferably from 25 to 120° C., and most desirably between 40 and 95° C. The pressure, while not of particular significance, should preferably be approximately atmospheric. When higher temperatures are employed, such as in excess of about 80° C., superatmospheric pressures are convenient to minimize the evaporation of the organic acids, and the other constituents present. The organic acid treatment results in a conversion of the peroxide compounds in the cycloalkanol oxidate to yield hydroxycarboxylic acids, oligomers or polymers of the hydroxycarboxylic acid, or esters of the hydrocarboxylic acid.

The strong organic carboxylic acids used in the instant invention have a pK (dissociation constant) of less than 4.8, preferably below 4.2, and most desirably below 3.8. Examples of such acids include acetic acid, adipic acid, benzoic acid, fumaric acid, maleic acid, oxalic acid, phthalic acid, trifluoroacetic acid and toluic acid. Where available, of course, the anhydride may be added, if water is present, in lieu of the acid. The above enumeration is not intended to be complete. For a plentary listing see Hodgman et al., Handbook of Chemistry & Physics, The Chemical Rubber Publishing Co., Cleveland (1960), volume 42, pp. 1753-1756.

The amount of the strong organic carboxylic acid should be at least 0.2 mole per mole of peroxidic and hydroxyl groups. Generally, more than 2 moles per mole would be the practical upper limit, however, greater amounts may be added without detriment to the rearrangement. Preferably, 0.5 to 1.5 moles per total moles of hydroxyl and peroxide group, and most desirably, 0.9 to 1.2 moles per total mole of said components are used.

In a particularly preferred embodiment of the instant invention, a corresponding ketone is added to increase the yield. For example, when a cyclohexanol oxidate is being rearranged, cyclohexanone may be added. These corresponding ketones can be characterized by the general formula:

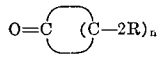

where R, and n, are as defined previously. Generally, between 1 and 5 moles of the ketone per mole of peroxide oxygen, preferably, between 1 and 3 moles per mole, are employed. Amounts of the ketone exceeding 5 moles per mole may be used, but generally no advantage results and it is economically undesirable.

The hydroxycarboxylic acids and derivatives thereof may be readily converted in known manner to lactams and lactones. For example, by heating the hydroxycaproic acid to about 295° C. for about 20 hours in an autoclave at a pressure of 2000 to 2500 p.s.i.g., in the presence of ammonia and water, caprolactam may be prepared.

In order to more fully illustrate the invention, attention is directed towards the following example:

EXAMPLE

Cyclohexanol oxidate is prepared by mixing 700 parts of cyclohexanol, 7 grams of commercial cyclohexanone peroxide and 7 grams of powdered calcium carbonate in a flask. Oxygen is bubbled through the mixture at a rate of 0.7 liter per minute (N.T.P.) while the temperature is rapidly raised to 120° C. After 8 liters of oxygen are absorbed, the flask is cooled to 110° C. and the oxygen passed therethrough until a total of 17 liters of oxygen are absorbed. Titration of the oxidate indicates the presence of approximately 0.1 mole of peroxidic oxygen per 100 grams of the oxidate. After filtering the oxidate free of solids, 100 parts by weight of the oxidate are combined with 25 parts of cyclohexanone. This is a ratio of 2.5:1 moles of ketone per mole of peroxidic oxygen. Table A shows the effect of the addition of various strong organic acids on the rearrangement.

TABLE A

| Run No. | Acid | pKa | Amt., gm. | T., °C. | Percent yield of omega-hydroxy-caproic acid and derivatives thereof |
|---|---|---|---|---|---|
| 1 | None | | | 60 | 3 |
| 2 | Acetic acid | 4.75 | 80 | 60 | 21 |
| 3 | do | 4.75 | 20 | 60 | 12 |
| 4 | do | 4.75 | 20 | 100 | 18 |
| 5 | Phathalic acid | 2.89 | 30 | 60 | 39 |
| 6 | Maleic acid | 1.83 | 20 | 60 | 25 |
| 7 | Trifluoroacetic acid | >1.0 | 60 | 60 | 34 |

It will be noted that the yield is markedly improved in each and every case. While the thermal decomposition gives yields of only about 3%, as shown in run No. 1, even the least effective acid cited, namely, acetic acid, more than triples the yield. Yields up to 39% are obtained by the addition of other acids.

It will be understood that modifications and variations may be effected without departing from the spirit of the invention.

What is claimed is:
1. A process for the preparation of hydroxycarboxylic acids and derivatives thereof which comprises contacting an oxidate of a cyclic secondary alcohol having from 4 to 12 ring carbon atoms at temperatures between 0° C. and 100° C. with at least 0.2 mol of an organic carboxylic acid selected from the group consisting of acetic acid, adipic acid, benzoic acid, fumaric acid, maleic acid, oxalic acid, phthalic acid, trifluoro acetic acid and toluic acid per mol of peroxidic and hydroxy groups in said oxidate.

2. A process according to claim 1 wherein the cyclic secondary alcohol is cyclohexanol.

3. A process according to claim 1 wherein the rearrangement is performed in the presence of a ketone which corresponds to the cyclic secondary alcohol.

4. A process according to claim 1 wherein cyclic secondary alcohol is contacted with oxygen to form an oxidate of the cyclic secondary alcohol.

5. A process according to claim 4 wherein the cyclic secondary alcohol is cyclohexanol and wherein said cyclohexanol is contacted with molecular oxygen at a temperature between about 60° C. and about 140° C.

References Cited

UNITED STATES PATENTS 2,904,584  9/1959  Payne et al. _____ 260—535
3,234,212  2/1966  Winnick et al. _____ 260—535

OTHER REFERENCES

Brown et al., J.A.C.S., vol. 77, pp. 1756-1759.

LORRAINE A. WEINBERGER, *Primary Examiner.*

A. P. HALLUIN, *Assistant Examiner.*